Figure 1:
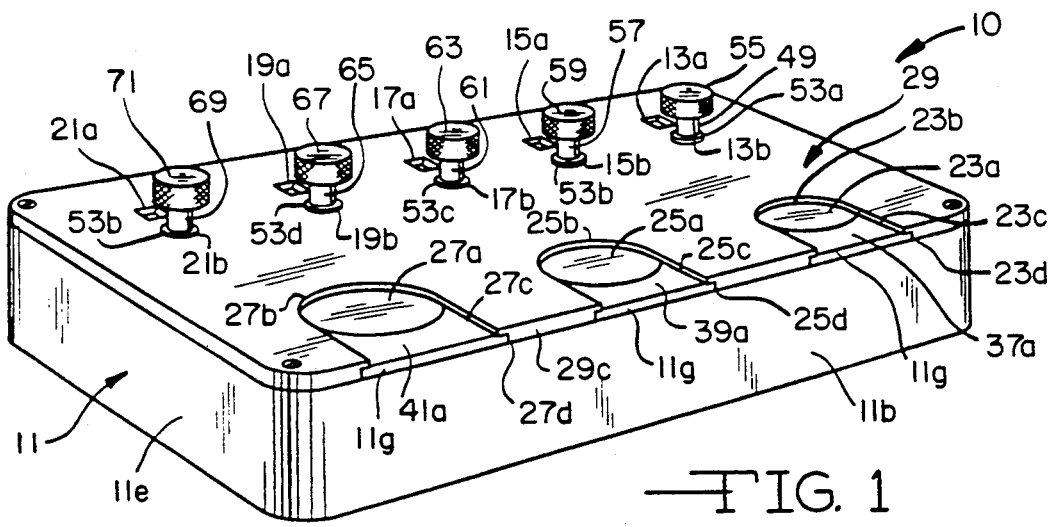

United States Patent [19]

Spaeth

[11] Patent Number: 5,112,276
[45] Date of Patent: May 12, 1992

[54] COMBINATION COIN AND MILEAGE MINDER

[76] Inventor: Ronald A. Spaeth, 3318 Doane Hwy., Grand Ledge, Mich. 48837

[21] Appl. No.: 696,719

[22] Filed: May 7, 1991

[51] Int. Cl.⁵ .................. C07D 1/08; G09F 11/04
[52] U.S. Cl. .................... 453/54; 40/495; 235/113
[58] Field of Search ............... 453/50, 51, 52, 53, 453/54; 235/114, 113; 40/495; 116/317, 318; 206/0.8, 0.81, 0.84; 221/309

[56] References Cited

U.S. PATENT DOCUMENTS

| | | |
|---|---|---|
| 542,107 | 7/1895 | Reinisch et al. ............. 235/113 X |
| 571,179 | 11/1896 | Wagner .......................... 453/54 |
| 1,460,908 | 7/1923 | Ingalls .......................... 235/113 X |
| 1,500,407 | 7/1924 | McLavey . |
| 1,581,374 | 4/1926 | Youngs ........................ 40/495 |
| 1,651,033 | 11/1927 | McClellan et al. ............ 40/495 |
| 1,694,048 | 12/1928 | White . |
| 1,777,897 | 10/1930 | Rothauser .................... 40/495 |
| 2,497,365 | 2/1950 | McMurtry . |
| 2,553,257 | 5/1951 | Honeyman . |
| 2,787,069 | 4/1957 | Ferguson et al. ............ 40/495 |
| 2,829,777 | 4/1958 | Berardinelli ................. 453/54 X |
| 3,100,494 | 8/1963 | Littman ........................ 453/50 |
| 3,169,331 | 2/1965 | Herster . |
| 3,245,522 | 4/1966 | Pearson . |
| 3,297,249 | 1/1967 | Light . |
| 3,393,688 | 7/1968 | Saverino . |
| 3,776,177 | 12/1973 | Bryant et al. . |
| 4,942,841 | 7/1990 | Drucker, Jr. ................. 116/317 |

FOREIGN PATENT DOCUMENTS

363828  9/1962  Switzerland .................. 453/54

*Primary Examiner*—Robert J. Spar
*Assistant Examiner*—Scott L. Lowe
*Attorney, Agent, or Firm*—Ian C. McLeod

[57] ABSTRACT

A coin dispenser and numerical register (10) having first, second, third, fourth and fifth numerical wheels (13), (15), (17), (19) and (21) and first, second and third coin receptacles (23), (25) and (27), mounted in a portable housing (11), is described. The first coin receptacle has a sleeve (37) for mounting a plurality of coins (35) while the first numerical wheel is mounted on a shaft (49) with an associated registering gear (51). The first coin receptacle and the first and the second numerical wheels are serviced by a common wire (47). The wire forms a spring (47b) that is disposed in the sleeve of the first coin receptacle for advancing the plurality of coins after an upper most coin is removed from the receptacle. The wire also forms a pawl (47c) in ratchet engagement with the registering gear of the first numerical wheel and an associated registering gear of the second numerical wheel. The pawl allows the wheels to only be easily turned in one direction for registering the indicia in their respective indicia openings in the face plate of the housing. The other coin receptacles and numerical wheels are in similarly cooperative relationships through servicing wires forming springs for the coin receptacles and pawls for the gears of the wheels. The housing is adapted to be mounted on a sun visor in an automobile with a mounting clip (75).

19 Claims, 1 Drawing Sheet

COMBINATION COIN AND MILEAGE MINDER

BACKGROUND OF THE INVENTION

(1) Field of the Invention

The present invention relates to a combination coin dispenser and numerical register device that is particularly useful in an automobile. In particular, the present invention is a device having a change holder and a five-digit numerical indicator that is adapted to be mounted on an automobile visor. By flipping the visor down, a driver can reach the device to store change, find coins for a parking meter or for paying a toll charge and at the same time, the driver can check the numerical display. Having easy access to coin change represents a safety advantage of the present invention because it eliminates the need for the driver having to reach into her pockets or purse while driving, in an attempt to find change for a toll booth. With the device, the driver can also readily check elapsed mileage on a trip or miles until the next oil change or routine service check-up, or other like occurrences. When the driver is finished using the device, she simply flips the visor up, and the device is safely hidden from view. The device can also be mounted on other parts of a car which are readily accessible by the driver, although the visor mounting is preferred.

(2) Prior Art

The prior art has described various types of coin holders and thumb wheel operated mileage record-/maintenance interval indicator devices. Illustrative of the prior art devices are U.S. Pat. No. 1,500,407 to McLavey; 1,694,048 to White; 2,497,365 to McMurtry; 2,553,257 to Honeyman; 3,169,331 to Herster; 3,245,522 to Pearson; 3,297,249 to Light; 3,393,688 to Saverino; and 3,776,177 to Bryant et McLavey describes a thumb wheel type mileage indicator for mounting on a vehicle cowl (dashboard) for reminding the driver when to fill up with oil or gasoline. The device is comprised of an elongated, hollow bar with five indicia wheels disposed inside A portion of each wheel extends beyond the bar for thumb control of the wheels. The indicia are viewed through openings provided in the bar.

White describes an indicator device for reminding drivers when the oil on the crankcase is to be changed or for indicating the elapsed mileage. The device is comprised of an elongated, hollow bar having five indicia wheels mounted in the bar. The indicia are viewed through openings in the bar and the wheels are set by inserting a probe into a corresponding slot in the bar to advance each of the wheels to the desired indicia.

McMurtry describes a coin change holder that is mounted on the dashboard of an automobile. The holder provides for mounting several coins so that they can be easily reached by a driver.

Honeyman shows a coin holder with a time indicator for indicating when to put money into parking meters. The device has a circular, disc shaped body comprised of opposed faces. One of the faces provides for mounting the time piece while the opposite face has three portions that serve as coin receptacles. The coins are deposited in the receptacles from openings in the edge of the holder.

Herster describes an indicia indicating device which is preferably useful in connection with servicing an automobile. The device provides a plurality of indicia carrying wheels arranged so that indicia on the perimeters of the wheels may be selected and positioned in registering with a plurality of windows. This way, mileage FIGURES may be shown to indicate the time at which a car needs to be serviced.

Pearson shows a coin and small article utility tray for automobiles.

Light describes a maintenance aid indicator comprised of a hollow, elongated bar with indicia wheels rotatably mounted in the bar. The wheels are numbered to indicate calendar days until an event or the specific date of the next scheduled maintenance service.

Saverino shows a stacked coin dispenser in the form of a U-shaped channel with a closed end and a partially cut away end for dispensing coins from the device. A slideable bumper in the channel urges the coin towards the dispensing end.

Bryant et al describes a service reminder apparatus for indicating mileage for various automotive maintenance periods. The apparatus has a plurality of numerical indicia carrying wheels arranged in rows and columns. Each of the wheels are rotatable from the rear of the apparatus and are visible individually from the front. Indicia adjacent to each row indicate the type of maintenance to be performed.

The prior art devices work well, however, there is a need for a portable device that provides both a coin receptacle and a numerical display. The present invention enables a driver of an automobile to safely reach coin change and to easily check the numerical display without compromising the drivers ability to be in control of her automobile. The present invention is also portable and light weight. This enables it to be carried in a pocket or a purse or it can be mounted in any conveniently accessible place in an automobile so that the driver or user can carry the coin receptacle and numerical display of the present invention wherever she goes.

OBJECTS

It is therefore an object of the present invention to provide a device that is preferably adapted for mounting in a car and which is a combined coin receptacle and numerical indicator. Further, it is an object of the present invention to provide a device that is preferably mounted on a car visor and which provides the driver with access to coin change for paying tolls, parking meters and the like and which also serves as a trip mileage indicator. Further, it is an object of the present invention to combine a loose change receptacle and a five-digit numerical indicator in a housing that is adapted to be readily mounted in an automobile. Still further, it is an object of the present invention to provide a coin receptacle and numerical indicator device that is simple to make and inexpensive to build and which is preferably marketed as a driver's aid device that is easily mounted in an automobile. These and other objects will become increasingly apparent by reference to the following descriptions and to the drawings.

IN THE DRAWING

FIG. 1 is a perspective view of a coin dispenser and numerical register device 10.

Figure 2:
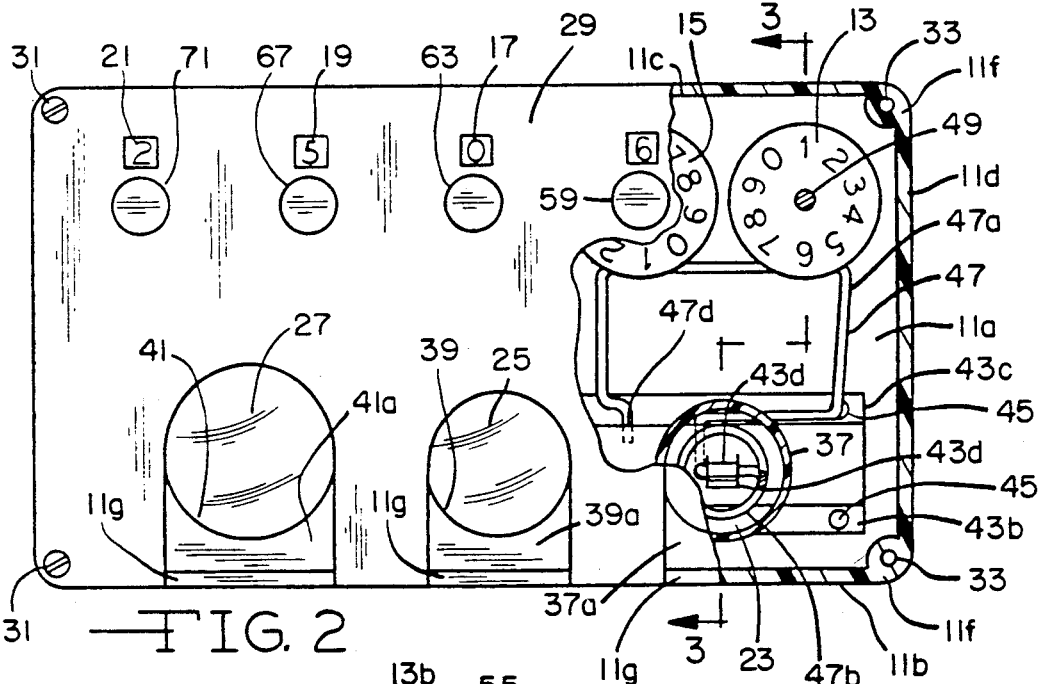

FIG. 2 is a partially cut away plan view of the coin dispenser and numerical register device 10 showing the coin receptacle 23 with associated sleeve 37 and spring 47b and the numbered wheels 13 and 15 engaged with a pawl portion 47a of the wire 47.

Figure 3:
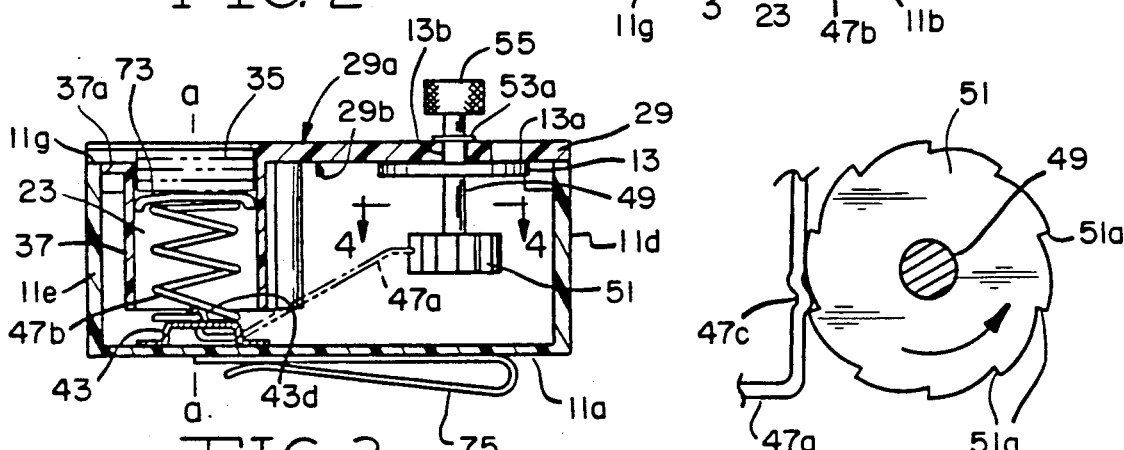

FIG. 3 is a cross-section view along line 3—3 of FIG. 2 showing the coin receptacle 23 with spring 47b holding a plurality of coins 35 in sleeve 37 and numerical wheel 13 with associated gear 51 in engagement with pawl portion 47a of wire 47.

Figure 4:

FIG. 4 is a cross-sectional view along line 4—4 of FIG. 3 showing gear 51 in ratchet engagement with pawl 47c.

GENERAL DESCRIPTION

The present invention relates to a combination coin dispenser and numerical register device which comprises: a housing means having a bottom wall and at least one sidewall extending from the bottom wall to a face plate, the face plate providing for at least one coin opening for dispensing coins at an edge of the face plate of the housing means and at least one indicia opening; at least one sleeve means depending from an underside of the face plate inside the housing means, the sleeve means having spaced apart ends providing an opening along a longitudinal axis of the sleeve means for mounting a plurality of coins in the opening of the sleeve means with the opening of the sleeve means in communication with the coin opening in the face plate of the housing means; at least one wheel means mounted inside the housing means on a shaft means, the shaft means extending through the face plate of the housing means to allow for rotation of the shaft means and the wheel means being provided with indicia so that when the shaft means is rotated, an indicia on the wheel means is indexed in the indicia opening in the face plate of the housing means; an indexing means mounted on the shaft means adjacent to the wheel means inside the housing means; and at least one advancing means mounted inside the housing means and servicing the sleeve means and the indexing means, the advancing means having a proximal portion and a distal portion, wherein the proximal portion of the advancing means advances the coins along the longitudinal axis of the sleeve means after an upper most coin is removed from the coin opening in the face plate of the housing means and wherein the distal portion of the advancing means is in engagement with the indexing means on the shaft means to maintain the wheel means in a particular position so that the shaft means selectively indexes the indicia on the wheel means in the indicia opening in the face plate of the housing means for viewing by an operator.

SPECIFIC DESCRIPTION

FIGS. 1 to 4 show the preferred embodiment of a combination coin dispenser and numerical register device 10 of the present invention. As shown particularly in FIGS. 1 and 2, the coin dispenser and register device 10 is comprised of a housing 11 which provides for mounting a plurality of numerical wheels 13, 15, 17, 19 and 21 and a plurality of coin receptacles 23, 25 and 27.

The housing 11 is preferably made of a plastic although other materials will also work well, and is comprised of a rectangular bottom wall 11a with spaced apart front and back walls 11b and 11c extending from the bottom wall 11a to a rectangular face or top plate 29. Opposed end walls 11d and 11e extend between the front and back walls 11b and 11c and complete the housing 11. The top plate 29 and the bottom wall 11a are parallel and have thin cross-sections with rounded corners. The junction of the front and back walls 11b and 11c and the end walls 11d and 11e are provided with inner enlarged portions 11f. The enlarged portions 11f provide for mounting the top plate 29 to the front and back walls 11b and 11c and the end walls 11d and 11e with screws 31 which threadably mate with openings 33 in the enlarged portion. 11f. It should be understood that the top plate 29 need not necessarily be secured to the front and back walls 11b and 11c and the end walls 11d and 11e by screws 31. Rivets, latches, epoxy resin, glue or other suitable fastening means are acceptable.

The top plate 29 is formed of an upper wall 29a and an inner surface 29b and provides for three coin dispensing openings 23a, 25a and 27a adjacent to the front wall 11b for the coin receptacles 23, 25 and 27, respectively. The first coin opening 23a extends from a front edge 29c (FIG. 1) of the top plate 29, adjacent to the front wall 11b, to a rounded portion 23b of the opening 23a. A rim 23c extends from the upper wall 29a along the perimeter of the opening 23a. The rim 23c provides a cross-section across the opening 23a that is slightly smaller than the diameter of a coin (not shown), which is preferably a dime 35. Below the rim 23c, adjacent to the inner surface 23b of the top plate 29, a portion 23d of the opening 23a, has a cross-section across the opening 23a that is slightly larger than the diameter of the dime 35. That way, the dime 35 can only be removed from the opening 23a by sliding the dime 35 along the opening 23a from the rounded portion 23b to the front wall 11b of the housing 11.

The second coin opening 25a extends from the front edge 29c of the top wall 29 to a rounded portion 25b of the opening 25a. A rim 25c extends from the upper wall 29a of the top plate 29 along the perimeter of the opening 25a. The rim 25c provides a cross-section across the opening that is slightly smaller than the diameter of a coin (not shown) which is preferably a nickel. Below the rim 25c, adjacent to the inner surface 29b of the top plate 29, a portion 25d of the opening 25a, has a cross-section across the opening 25a that is slightly larger than the diameter of a nickel (not shown). The rim 25c ensures that a nickel can only be removed from the opening 25a by sliding the nickel along the opening 25a from the rounded portion 25b to the front wall 11b.

In a similar manner as the first and second coin openings 23a and 25a, the third coin opening 27a extends from the edge 29a of the top wall 29 to a rounded portion 27b of the opening 27a. A rim 27c extends from the upper wall 29a of the top plate 29 along the perimeter of the opening 27a. The rim 27c provides a cross-section across the opening 27a that is slightly smaller than the diameter of a coin (not shown), which is preferably a quarter. Below the rim 27c, adjacent to the inner surface 29b of the top plate 29, a portion 27d of the opening 27b has a cross-section across the opening 27a that is slightly larger than the diameter of a quarter (not shown). Rim 27c ensures that a quarter can only be removed from the opening 27a by sliding the quarter along the opening 27a from the rounded portion 27b to the front wall 11b.

The top plate 29 has a thickness that is sufficient to provide for the rims 23c, 25c and 27c in addition to providing for the portions 23d, 25d and 27d having a thickness that is sufficient to allow a nickel to slide out of the openings 23a, 25a and 27a, respectively. A nickel has the thickest cross-section of the three coins that will be dispensed from the housing 11.

As shown in FIGS. 2 and 3, a cylindrical sleeve 37, having a longitudinal axis a—a is in communication with opening 23a. The sleeve 37 depends from the inner surface 29b of the top plate 29 to a distance spaced above the from the sleeve 37, adjacent to the top plate 29, to an upper edge 11g of the front wall 11b. Sleeve 37 is slightly larger in cross-section along the longitudinal axis a-a than the dime 35 and provides for storing a plurality of dimes 35.

In a similar manner, a sleeve 39, in communication with opening 25a, depends from the top plate 29 to a distance spaced above the bottom wall 11a, (FIG. 3). A ledge 39a extends from the sleeve 39, adjacent to the top plate 29, to the upper edge 11g of the front wall 11b. Sleeve 39 is slightly larger in cross-section along its longitudinal axis than a nickel (not shown) and provides for storing a plurality of nickels.

Also, a sleeve 41, in communication with opening 27a, depends from the top plate 29 to a distance spaced above the bottom wall 11a. A ledge 41a extends from the sleeve 41, adjacent to the top plate 29, to the upper edge 11g of the front wall 11b. Sleeve 41 is slightly larger in cross-section along its longitudinal axis than a quarter (not shown) and provides for storing a plurality of quarters.

Directly below the sleeves 37, 39 and 41, and mounted on the bottom wall 11a of the housing 11, is a mounting bar 43. Bar 43 is comprised of an elongated strip of sheet metal and has a raised middle 43a (FIG. 3) between spaced apart sides 43b and 43c (FIG. 2). The sides 43b and 43c are mounted on the bottom wall 11a with rivets 45 (two shown). A portion of the middle 43a of the bar 43 is bent upward to form an inverted U-shaped extension or securing tab 43d for mounting a wire 47. Although only one extension 43d is shown in FIGS. 2 and 3, it should be understood that the bar 43 has two similar extensions (not shown) extending upward from the middle 43a of the bar 43 under the sleeves 39 and 41.

As shown in FIG. 1, the top plate 29 has five sets of tandem square and circular openings 13a and 13b, 15a and 15b, 17a and 17b, 19a and 19b and 21a and 21b for mounting numbered wheels 13, 15, 17, 19 and 21, respectively. The numbered wheels 13, 15, 17, 19 and 21 represent the ones, tens, hundreds, thousands and ten-thousands digits, respectively. The ones tandem of openings, 13a and 13b, is representative of the other four tandems. Opening 13a is adjacent to the back wall 11c of the housing 11 and opening 13b is adjacent to the opening 13a, spaced from the back wall 11c. A cylindrical shaft 49 extends through the circular opening 13b to an associated gear 51 (FIG. 3) mounted inside the housing 11 at the lower end of the shaft 49. The numbered wheel 13 for the ones digit, is mounted inside the housing 11 at an intermediate position on the shaft 49, adjacent to the inner surface 29b of the top plate 29. The square opening 13b is positioned with respect to the circular opening 13a and the shaft 49 so that the number indicia on the wheel 13 are visible through the square opening 13b. A retaining washer 53a is mounted on the shaft 49 against the top plate 29 and a knurled knob 55 is provided at the top of the shaft 49. The knob 55 enables a user to turn the numbered wheel 13 to change the numbered indicia indexed in the square opening 13a.

In a similar manner, the tens wheel 15 is mounted on a shaft 57 in opening 15b with a knurled knob 59 for indexing the numbered indicia in the opening 15a. The hundreds wheel 17 is mounted on a shaft 61 in opening 17b with a knurled knob 63 for indexing the numbered indicia in the opening 17a. The thousands wheel 19 is mounted on a shaft 65 in opening 19b with a knurled knob 67 for indexing the numbered indicia in the opening 19a. And finally, the ten-thousands wheel 21 is mounted on a shaft 69 in opening 21b with a knurled knob 71 for indexing the numbered indicia in the opening 21a. In a similar manner as the ones shaft 49, the shafts 57, 61, 65 and 69 are provided with retaining washers 53b, 53c, 53d and 53e, respectively, and associated gears (not shown) in a similar manner as gear 51 mounted on the lower end of shaft 49.

As shown in FIG. 4, the ones digit gear 51 has ten teeth 51a which correspond to the ten digits, zero to nine on the wheel 13. Wheel 13 and the dime coin receptacle 23 are serviced by wire 47 mounted in extension 43d of the mounting bar 43. The wire 47 forms a pawl portion 47a and a coil spring portion 47b. The pawl portion 47a extends from the extension 43d and forms a first pawl 47c in a ratchet relationship with the gear 51 for controlling the direction of rotation of the ones digit wheel 13 and a second pawl (not shown) in a ratchet relationship with the tens gear (not shown) for controlling the rotation of the tens wheel 15. The first pawl 47c only allows the ones digit wheel 13 to be turned easily in a counter-clockwise direction for changing the numerical indicia in the square opening 13a. The tens pawl operates in a similar manner. The pawl portion 47a of the wire 47 extends to an end 47d mounted on the bar 43.

The coil spring portion 47b of wire 47 is mounted in the sleeve 37, forming the dime receptacle 23, and has a spiral shape, providing an advancing means for the sleeve 37 The spring 47b urges the plurality of dimes 35 towards rim 23c adjacent to the opening 23a. A circular plate 73 with a downwardly turned outer periphery is mounted on the spring 47b and acts to keep the spring 47b centered in the sleeve 37, essentially coaxially with the axis a—a. The spring 47b ensures that the first dime will be in an upward position in the coin opening 23a so that a user of the device 10 can easily slide the first dime 35 from the receptacle 23.

As shown in FIGS. 1 and 2, there are three coin receptacles 23, 25 and 27 and five numbered wheels 13, 15, 17, 19 and 21. In the preferred embodiment of the present invention, numbered wheels 13 and 15 and coin receptacle 23 are serviced by the first wire 47. Coin receptacle 25 and numbered wheels 17 and 19 are serviced by a second wire (not shown) in a similar manner as wire 47 services wheels 13 and 15 and coin receptacle 23. Finally, coin receptacle 27 and wheel 21 are serviced by a third wire (not shown). It should be understood that the arrangement of the coin receptacles 23, 25 and 27 and the numbered wheels 13, 15, 17, 19 and 21 through their respective wires (only wire 47 shown) need not necessarily be as described above. What is important is that the coin receptacles 23, 25 and 27 and the numbered wheels 13, 15, 17, 19 and 21 are serviced by their respective connecting wires (only wire 47 shown).

As shown in FIG. 3, the coin dispenser and register device 10 is completed by a clip 75 mounted on the bottom wall 11a of the housing 11. The clip 75 serves for mounting the device 10 on a car visor (not shown). In this manner, when the visor is turned down, the device 10 will be readily available to a driver of an automobile so that the driver can conveniently reach for change or quickly check the numerical register. After the device 10 has been used, the visor is flipped up and the device 10 is safely hidden from view. The clip 75 is preferably made of metal, but a durable plastic will work just as well. The clip 75 can be removeable. This would enable the device 10 to be secured to a surface by a variety of means including, but not limited to, magnets, suction cups and velcro ® strips. The device 10 could even be permanently mounted by screws, rivets, glue or other fastening means, although this is not preferred.

Numerous variations will occur to those skilled in the art. It is intended that the foregoing descriptions be only illustrative of the present invention and that the present invention be limited only by the hereinafter appended claims.

I claim:

1. A combination coin dispenser and numerical register device which comprises:
   (a) a housing means having a bottom wall and at least one sidewall extending from the bottom wall to a face plate, the face plate providing for at least one coin opening for dispensing coins at an edge of the face plate of the housing means and at least one indicia opening;
   (b) at least one sleeve means depending from an underside of the face plate inside the housing means, the sleeve means having spaced apart ends providing an opening along a longitudinal axis of the sleeve means for mounting a plurality of coins in the opening of the sleeve means with the opening of the sleeve means in communication with the coin opening in the face plate of the housing means;
   (c) at least one wheel means mounted inside the housing means on a shaft means, the shaft means extending through the face plate of the housing means to allow for rotation of the shaft means and the wheel means being provided with indicia so that when the shaft is rotated, an indicia on the wheel means is indexed in the indicia opening in the face plate of the housing means;
   (d) an indexing means mounted on the shaft means adjacent to the wheel means inside the housing means; and
   (e) at least one advancing means mounted inside the housing means and servicing the sleeve means and the indexing means, the advancing means having a proximal portion and a distal portion, wherein the proximal portion of the advancing means advances the coins along the longitudinal axis of the sleeve means after an upper most coin is removed from the coin opening in the face plate of the housing means and wherein the distal portion of the advancing means is in engagement with the indexing means on the shaft means to maintain the wheel means in a particular position, so that the shaft means selectively indexes the indicia on the wheel means in the indicia opening in the face plate of the housing means for viewing by an operator.

2. The device of claim 1 wherein there is a first, a second and a third coin opening with an associated first, second and third sleeve means in communication with the respective coin openings and a first, a second, a third, a fourth and a fifth indicia opening in the face plate of the housing means with an associated first, second, third, fourth and fifth wheel means on respective shaft means with associated indexing means for selectively indexing the indicia on the respective wheel means in the respective indicia openings in the face plate of the housing means, wherein one of the three coin openings corresponds to at least one of the five wheel means through a first advancing means and wherein the first advancing means is a first spring means having a proximal portion that advances a plurality of coins along a longitudinal axis of the sleeve means after an upper most coin is removed from the one of the coin openings and a distal portion in ratchet engagement with the indexing means on the shaft means of at least one of the wheel means for selectively indexing the indicia on the one of the wheel means in its respective indicia opening in the face plate of the housing means for viewing by an operator.

3. The device of claim 2 wherein the first spring means is mounted inside the housing means with the proximal portion of the first spring means extending in an opening in the first sleeve means to advance the plurality of coins in the first sleeve means after the upper most coin is removed from the first coin opening and with the distal portion forming a first and a second pawl means, the first pawl means in ratchet engagement with the indexing means on the shaft means of the first wheel means for selectively indexing the indicia on the first wheel means in the first indicia opening and the second pawl means in ratchet engagement with the indexing means on the shaft means of the second wheel means for selectively indexing the indicia on the second wheel means in the second indicia opening and wherein a second spring means is mounted inside the housing means and has a proximal portion extending in an opening in the second sleeve means to advance a plurality of coins in the second sleeve means after an upper most coin is removed from the second coin opening and a distal portion having a third and a fourth pawl means, the third pawl means in ratchet engagement with the indexing means on the shaft means of the third wheel means for selectively indexing the indicia on the third wheel means in the third indicia opening and the fourth pawl means in ratchet engagement with the indexing means on the shaft means of the fourth wheel means for selectively indexing the indicia on the fourth wheel means in the fourth indicia opening and wherein a third spring means is mounted inside the housing means and has a proximal portion extending in an opening in the third sleeve means to advance a plurality of coins in the third sleeve means after an upper most coin is removed from the third coin opening and a distal portion having a fifth pawl means in ratchet engagement with the indexing means on the shaft means of the fifth wheel means for selectively indexing the indicia on the fifth wheel means in the fifth indicia opening.

4. The device of claim 1 wherein the sidewall extending from the bottom wall of the housing means is comprised of spaced apart front and back sidewalls with opposed end walls between the sidewalls and wherein the sleeve means in communication with the coin opening in the face plate of the housing means, depends from the underside of the face plate, spaced from the front sidewall of the housing means, with the coin opening in the face plate extending from the sleeve means to the front sidewall for removing coins from the coin opening.

5. The device of claim 4 wherein a rim means extends from an upper surface of the face plate of the housing means, along the periphery of the coin opening, the rim means having a first cross-section less than the diameter of a coin for retaining the coin in the sleeve means adjacent to the coin opening and with the coin opening having a second cross-section beneath the rim means, greater than the diameter of the coin, for enabling a first coin to be removed from the sleeve means by sliding the first coin along the second cross-section of the coin opening towards the front sidewall of the housing means.

6. The device of claim 3 wherein the first, the second and the third coin openings are adapted for dispensing dimes, nickels and quarters, respectively.

7. The device of claim 1 wherein the wheel means has a top face and a bottom face with the top face adjacent to an underside of the face plate of the housing means and inscribed with the indicia which are viewed by an operator of the device in the indicia opening in the face plate of the housing means.

8. The device of claim 7 wherein the indicia on the wheel means are numbers.

9. The device of claim 1 wherein the shaft means is provided with a knob means for rotating the wheel means to change the indicia in the indicia opening in the face plate of the housing means.

10. The device of claim 9 wherein the knob means is knurled.

11. The device of claim 1 wherein the indexing means is a gear means with teeth selectively inclined to ratchet with the distal portion of the advancing means so that the wheel means can only easily rotate in one direction around a longitudinal axis of the shaft means.

12. The device of claim 1 wherein the indicia opening is adjacent to the back sidewall of the housing means.

13. The device of claim 1 wherein the proximal portion of the advancing means provided in the sleeve means is a coil spring means.

14. The device of claim 1 wherein the advancing means is mounted to a bar means, mounted on the bottom wall of the housing means.

15. The device of claim 13 wherein a guide plate means is mounted on the coil spring means adjacent to the plurality of coins in the sleeve means to guide the coil spring means along the longitudinal axis of the sleeve means.

16. The device of claim 1 wherein the housing means is made of a plastic.

17. The device of claim 1 wherein the housing means is made of a metal.

18. The device of claim 1 wherein the housing means is provided with a mounting means which is adapted for mounting the device in an automobile.

19. The device of claim 18 wherein the mounting means is a clip for mounting the device on a visor in an automobile.

* * * * *

UNITED STATES PATENT AND TRADEMARK OFFICE
CERTIFICATE OF CORRECTION

PATENT NO. : 5,112,276
DATED : May 12, 1992
INVENTOR(S) : Ronald A. Spaeth

It is certified that error appears in the above-indentified patent and that said Letters Patent is hereby corrected as shown below:

Column 1, line 36, "Bryant et" should be --Bryant et al--.

Column 1, line 41, a period --.-- should be inserted after "inside" and before "A".

Column 2, line 3, "FIGURES" should be --figures--.

Column 2, line 60, "In The Drawing", should be --In The Drawings--.

Column 5, line 1, after "the" and before "from", the following should be inserted --bottom wall 11a of the housing 11. A ledge 37a extends--.

Column 6, line 30 a period --.-- should be inserted after "37" and before "The".

Signed and Sealed this

Third Day of August, 1993

Attest:

MICHAEL K. KIRK

*Attesting Officer*   *Acting Commissioner of Patents and Trademarks*